United States Patent
Gajjar et al.

(10) Patent No.: US 6,385,674 B1
(45) Date of Patent: *May 7, 2002

(54) SYSTEMS AND METHODS FOR DYNAMIC ALIGNMENT OF ASSOCIATED PORTIONS OF A CODE WORD FROM A PLURALITY OF ASYNCHRONOUS SOURCES

(75) Inventors: Kumar Gajjar, San Jose; Larry P. Henson, Santa Clara, both of CA (US)

(73) Assignee: MTI Technology Corporation, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,581

(22) Filed: Sep. 20, 1999

Related U.S. Application Data

(63) Continuation of application No. 08/891,213, filed on Jul. 10, 1997, now Pat. No. 5,956,524, which is a continuation of application No. 08/184,896, filed on Jan. 19, 1994, now abandoned, which is a continuation of application No. 07/505,446, filed on Apr. 6, 1990, now abandoned.

(51) Int. Cl.$^7$ .............................................. G06F 11/00
(52) U.S. Cl. ......................................... 710/62; 714/770
(58) Field of Search .............................. 710/62, 65, 66, 710/52; 714/1, 5, 6, 770

(56) References Cited

U.S. PATENT DOCUMENTS

| | | | |
|---|---|---|---|
| 4,849,929 A | 7/1989 | Timsit | 714/5 |
| 5,956,524 A | 9/1999 | Gajjar et al. | 710/52 |

*Primary Examiner*—Dung Dinh
(74) *Attorney, Agent, or Firm*—Townsend and Townsend and Crew LLP

(57) ABSTRACT

The present invention is directed to a novel apparatus for "on-the-fly" data correction and regeneration of a plurality of data read from and stored to a plurality of storage devices. A control circuit is provided for control of data flow to and from the storage devices. The control circuit establishes and maintains a relatively simple semaphore between itself and an interface circuit controlling a FIFO buffer. A mask register is provided as a type of programmable logic AND gate to assert a master ready signal when each of a selected plurality of the interface circuits, one interface circuit per FIFO buffer, indicates that its respective FIFO buffer is ready, either to output or input an entire block. When each is ready, routing and correction commences under control of the control circuit until an entire block has been processed. Each interface circuit includes an associated flip/flop having an output which provides an indication of the ready status. When the flip/flop is set by the interface circuit, the FIFO buffer is ready. When the control circuit resets the flip/flop, the interface circuit establishes that an entire block has been processed.

15 Claims, 5 Drawing Sheets

SYSTEMS AND METHODS FOR DYNAMIC ALIGNMENT OF ASSOCIATED PORTIONS OF A CODE WORD FROM A PLURALITY OF ASYNCHRONOUS SOURCES

CONTINUING DATA AS CLAIMED BY APPLICANT

This application is a Continuation of Ser. No. 08/891,213, Jul. 10, 1997 U.S. Pat. No. 5,956,524 which is a Continuation of Ser. No. 08/184,896, Jan. 19, 1994 (abandoned) which is a Continuation of Ser. No. 07/505,446, Apr. 6, 1990 (abandoned).

BACKGROUND OF THE INVENTION

The present invention relates generally to the generation and checking of redundancy data.

In conventional mass data storage systems employing a group of storage devices, it is known to use error correction methodologies to correct or to regenerate data for a particular failed storage device by use of a redundancy code which is generated and stored on other storage devices. These conventional correction methodologies require that all the relevant data be combined in a memory before it can be processed to generate or to regenerate a code word. As used herein, the term "code word" refers to a group of bytes of data and the redundancy code generated from such group.

SUMMARY OF THE INVENTION

The present invention is a method and apparatus for dynamic alignment of a group of associated portions of a code word for presentation to a processing circuit. In a preferred embodiment, the invention sequences in alignment a group of associated code word portions which are each stored independently of one another and which will be processed together to either generate the redundancy for a code word or correct a faulty associated portion of a code word by use of the redundant data.

A preferred embodiment of the present invention is directed to a system for synchronizing parallel processing, by an array correction circuit, of a group of blocks of data transferred over parallel buses between two groups of storage devices.

The preferred embodiment includes two circuits, each one associated with one of the two groups of storage devices, for asserting a ready signal from each of the storage devices. These ready signals are independently asserted, with each ready signal being asserted when its associated storage device is ready to be accessed. This access may be a read or a write of a preselected number of bytes of data, generally a block of data. The array correction circuit provides enable signals to the storage devices when all the necessary ready signals are received. Ready signals from both groups are needed since the data must be read from one group and stored in the other group (after processing). In one embodiment, the storage devices are buffer memories in a data path from an external computer to a group of disk drives. One group of buffers is connected to the disk drives and the other groups is connected to the external computer.

Two mask registers are provided, one for each group of storage devices. Each mask register can be programmed to select a set of the storage devices in a group. Each mask register generates a master ready signal when all the read signals of the selected set are present.

The array correction circuit includes a sequencer and a counter. The sequencer is responsive to the concurrent assertion of the master ready signals of the two mask register circuits to enable, with strobe signals, the transfer of a block of data from storage devices which are to be read and process them together. After processing, the blocks of data are loaded into the storage devices which are to be written in response to strobe signals asserted by the sequencer. The counter permits the array correction circuit to establish when an entire block has been read from each Of the storage devices by sequencing through a count equal to the block size. Processing of code words of the remaining plurality of blocks of data will be inhibited until both the master ready signals are again asserted concurrently.

Data is properly synchronized between the selected groups of storage devices and the array correction circuit by use of the present invention in an efficient and convenient manner.

DETAILED DESCRIPTION OF A PREFERRED EMBODIMENT

It is an object of the present invention to improve error correction methodologies for a plurality of storage devices by implementing a redundancy code generation and correction system which operates on data during a parallel data transfer "on-the-fly". Special problems are encountered when implementing "on-the-fly" correction. Specifically, for typical applications, a plurality of data bytes will be used to generate redundancy data. The data bytes and the redundant data bytes are considered to be associated portions of the newly created code word. By storing the associated portions on different storage devices, access times for those portions may be presented to the processing circuit out of synchronization with other portions, causing erroneous data to be generated unless a time skew which may arise between the associated code word portions is removed. Removal of this time skew may be referred to as alignment of the code word portions. The processing circuit is typically significantly faster than the storage devices, so the processing circuit may be used in a time multiplexing fashion, generating or regenerating code words from different sets of storage devices in an I interleaved manner.

Figure 1:
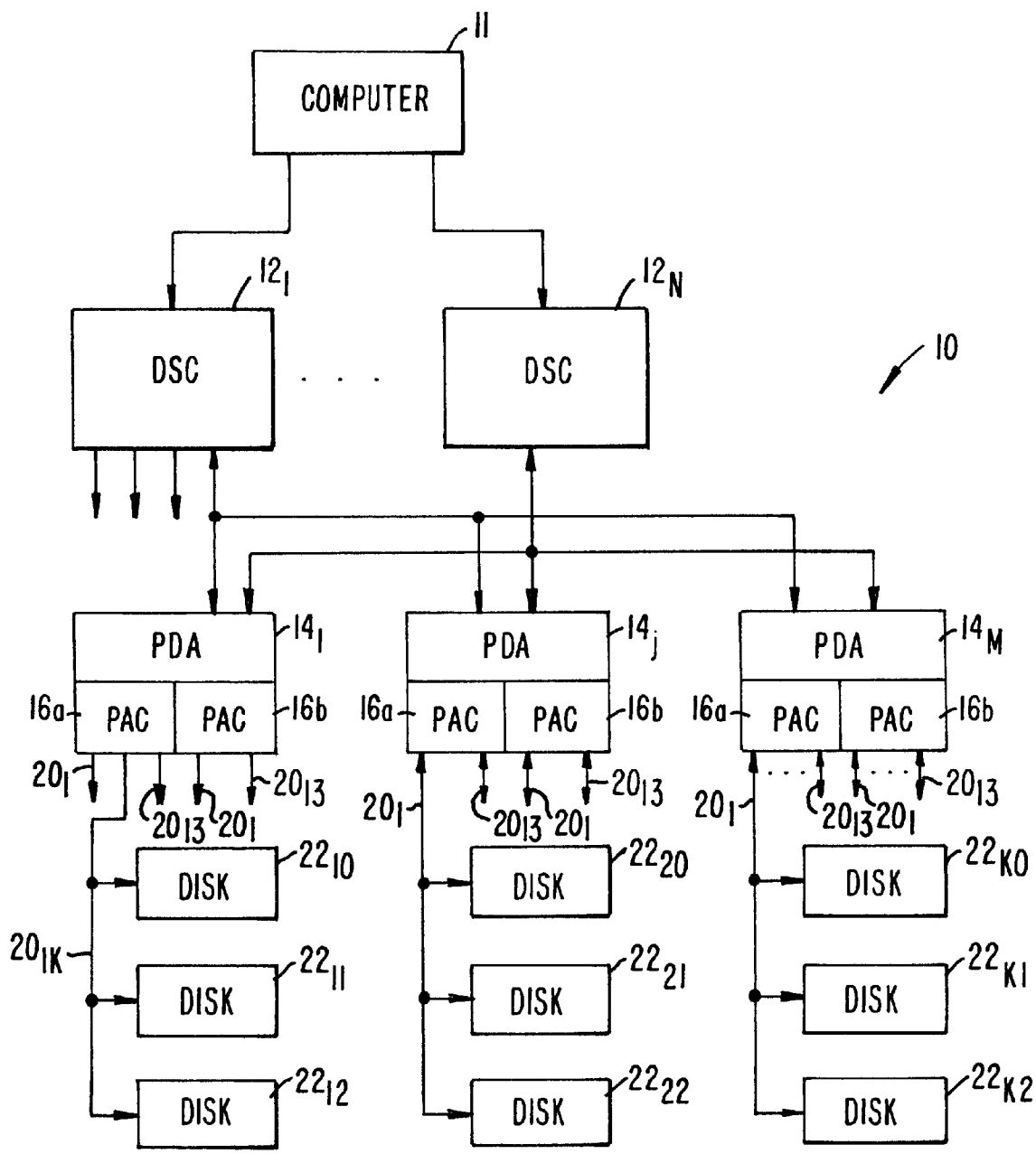
FIG. 1 is a block diagram of a preferred embodiment of the present invention which performs correction during a data transfer.

FIG. 1 is a block diagram of a preferred embodiment of a system 10 which includes a plurality of dynamic storage controllers ("DSC") $12_i$ with each coupled to a plurality of parallel device arrays ("PDA") $14_j$. In the illustrated embodiment, each PDA $14_j$ includes a first and a second parallel array controller ("PAC") 16a and 16b.

Each PAC $16_i$ includes thirteen interfaces and control lines $20_i$. for controlling a set of storage devices, for example, a set of disk drives $22_{ij}$. The illustrated embodiment includes a plurality of disk drives $22_{10}, 22_{11}, \ldots 22_{1N}$ divided into horizontal groups and accessed by an interface and control line $20_i$. Data from the computer 11 is transferred through one of the DSCs $12_i$ and one of the PACs $16_i$ to the selected disk(s) $22_{ij}$. The two level arrangement of DSCs $12_i$ and PACs $16_i$ allows rerouting of data transparent to the computer.

Figure 2:
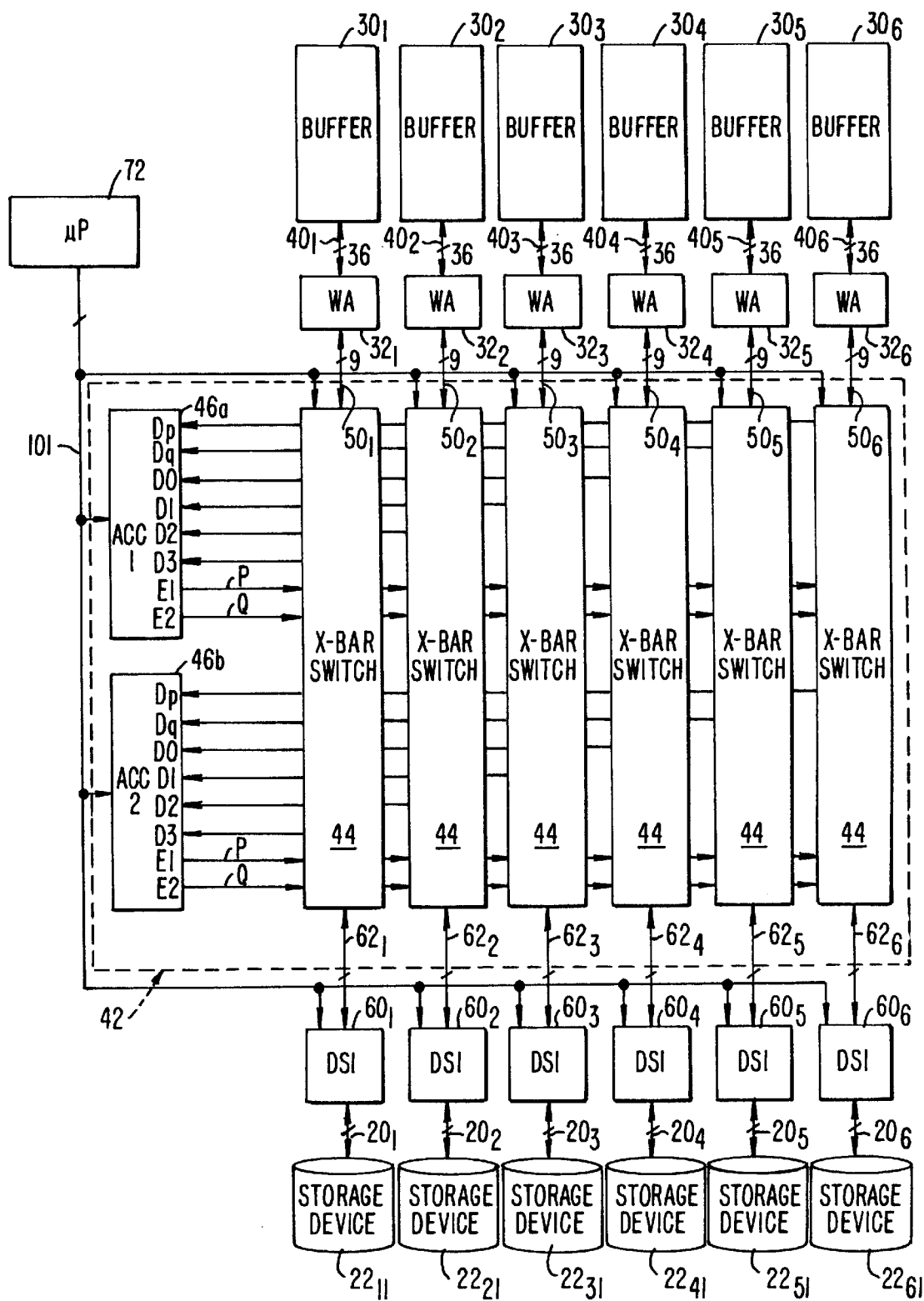
FIG. 2 is a block diagram of a portion of a parallel array controller (PAC) 16 of FIG. 1.

FIG. 2 is a block diagram of selected circuitry of one of the PACs $16_i$ of FIG. 1 including thirteen interfaces and control lines $20_i$ shown in FIG. 1. PAC $16_i$ includes thirteen buffers $30_i$ (six of which are illustrated) which store a plurality of words of data. The preferred embodiment includes one buffer $30_i$ for each interface and control line $20_i$. A word assembler ("WA") $32_i$ is provided for each buffer $30_i$ and is coupled to its respective buffer $30_i$ by a transfer bus $40_i$ transmitting 36 bits in parallel. Each WA $32_i$ is coupled to a routing and correcting circuit ("RACC") 42 by a 9 bit bus $50_i$. The WA $32_i$ circuits reconfigure data to translate between the two bus sizes. Routing and correcting circuit 42 includes a plurality of crossbar switches 44. A first and a second array correction circuit ("ACC") 46a and 46b are provided and are coupled to each crossbar switch 44. Two correction buses, bus P and bug Q are provided for each ACC 46a and 46b, for implementation of a derived error correction methodology. Each ACC 46a and 46b is coupled to a plurality of data buses $50_i$ each having 9 data bits via crossbar switch 42. Each crossbar switch 44 is coupled to a Device SCSI ("Small Computer System Interface") Interface ("IDSI") $60_i$ by a data path $62_i$ transferring 9 bits in parallel. SCSI is an interface providing device independence within a class of devices. The American National Standard For Information Processing ("ANSI") has promulgated a standard for SCSI and is described in ANSI document number X3. 130–1986.

There are thirteen DSI $60_i$ units (six of which are illustrated) included with each PAC $16_i$. As described above, each DSI $60_i$ controls three disk drives $22_{ij}$ via interfaces and control lines $20_i$.

The system illustrated in FIG. 1 and FIG. 2 for implementing "on-the-fly" correction includes three modes of operation. These modes include: 1) "simple read/write" mode, 2) "generation of redundancy data" mode, and 3) "correction" mode, with each mode controlled by the microprocessor 72. In the simple read/write mode, the crossbar switch 44 are put into a pass-through state and data is directed from a particular disk drive to a particular buffer without use of ACC units 46a or 46b. In the generation of redundancy data mode, two new blocks of data, a P redundant block and a Q redundant block are created. Either the first ACC unit 46a or the second ACC unit 46b is used for the redundancy data generation mode. Data which is to be written to disk drives $22_{ij}$ of FIG. 2. may be written in parallel, for example, in a group of three words, with three buffers $30_i$ ready to record data to a particular set of three disk drives of a horizontal group, for example disk drive $22_{11}$, disk drive $22_{21}$ and disk drive $22_{31}$. When data is being written to these disk drives, the ACC unit generates the P and Q redundancy data blocks in parallel with the data being transferred from buffers $30_1$, $30_2$ and $30_3$ to drives $22_{11}$, $22_{21}$, and $22_{31}$. These P and Q redundancy data blocks are each recorded on disk drives reserved for this purpose, referred to as P and Q drives which may, for example, be drives $22_{51}$ and $22_{61}$ of FIG. 2. Thus, particular P and Q redundancy data blocks are established on the P and Q drives for associated data recorded on other disk drives $22_{ij}$. Thereafter, if a disk error, for example, should render data from a particular disk unavailable, or if an error is detected from a prior read operation, then relevant P and Q redundancy data are used along with the remaining associated data to correct or regenerate the missing data. This is the third mode referred to as the correction or regeneration mode which is operational after a fault has been detected. Detection and reconstruction occur as separate and distinct operations with respect to a particular ACC 46. In a read operation, the ACC units compare the data read with the P and Q redundancy block while data is being transferred from DSIs $60_i$, to buffers $30_i$. If an error is detected from one or two disk drives, the lost data can be regenerated using the P. and Q redundancy blocks. A reconstruction of the data may be accomplished by regenerating the data into a spare buffer reserved for this purpose and subsequently performing a simple write (because the P and Q redundancy data blocks have already been established and only one disk drive is needed to record the regenerated data) to a spare disk drive reserved for this purpose. Thereafter, the failed disk drive may become the spare disk drive after the required maintenance and repair, as necessary, has been performed.

As the reader will appreciate, it is important to synchronize the data for the routing and correcting circuit 42 to ensure that only associated data is processed together when either the P and Q redundancy data blocks are being generated or when missing data is being regenerated. Access times of the various storage devices will vary and prevent automatic alignment of associated data during generation or correction modes. To ensure that the routing and correcting circuit 42 operates at full speed, without undue delay, a manner of synchronized processing is necessary. This synchronized processing requires that all data to be processed by the routing and correcting circuit 42 be immediately available before initiation of the processing.

Figure 3:
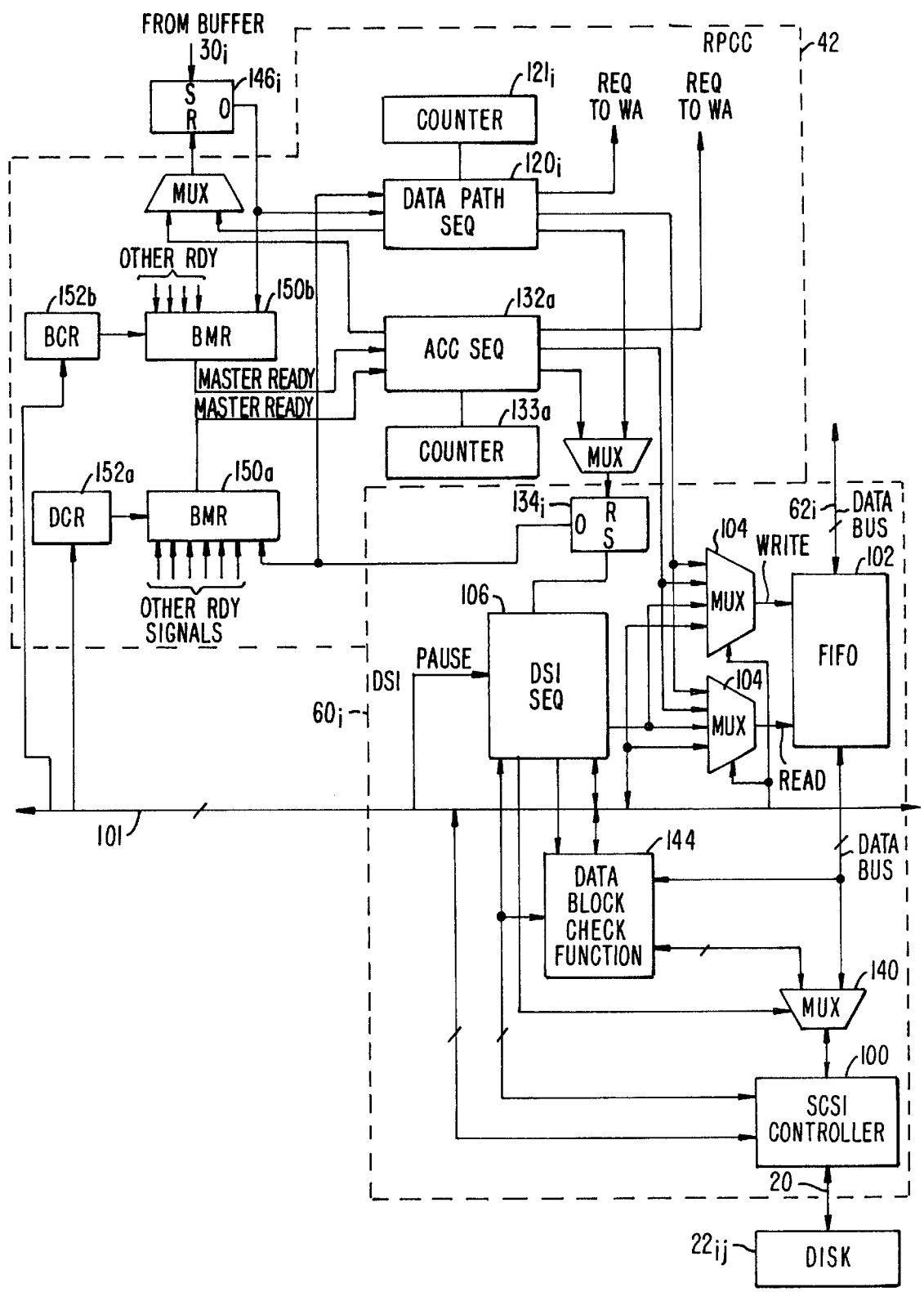
FIG. 3 is a block diagram of a preferred embodiment of the sequencing circuitry for the embodiment of FIG. 2.

FIG. 3 is a block diagram of a preferred embodiment of the present invention with components of DSI $60i$ and routing and correcting circuit 42 shown in detail. Only portions of ACC 46a are shown. To interface routing and correcting circuit 42 with disk drive $22_{ij}$, a Small Computer System Interface ("SCSI") controller 100 has been selected as a disk access protocol. The SCSI standard will not be further described except to comment that SCSI controller 100 operates on a group of data and accesses data one byte at a time in response to control information including request and acknowledge handshake signals.

The overall system operates on data transferred in block-size portions, with the block size preferably established as equal to a sector size of disk drive $22_{ij}$. Block size information is provided to the components of FIG. 3 from the microprocessor 72 of FIG. 2 via the processor bus 101.

DSI $60_i$ includes an elasticity first-in-first-out ("FIFO") buffer 102 for storing data which is to be written to disk drive $22_{ij}$ or which has been read from disk drive $22_{ij}$. Synchronization of the processing on associated data by routing and correcting circuit 42 is desired during both writes to and reads from FIFO buffer 102. Therefore, the generic phrase "data access" shall be used to refer to either a buffer write operation or a buffer read operation.

FIFO buffer 102 is responsive to assertions of various control and handshake signals from various components to move data relative to both SCSI controller 100 and data path $62_i$. FIFO buffer 102 independently outputs stored data in the order in which it was received. It is preferable that FIFO buffer 102 have a storage capacity at least equal to twice a sector size of data stored on disk drive $22_{ij}$.

The various control and handshake signals to which FIFO buffer 102 is responsive include a write strobe signal and a read strobe signal. An assertion of the read strobe signal causes FIFO buffer 102 to output a byte of data and an assertion of the write strobe signal causes FIFO buffer 102 to store a byte of data. Control signals are provided which configure FIFO buffer 102 to output data either to SCSI controller 100 or data path $62_i$. Of course these control signals also configure FIFO buffer 102 to read data from the other system, namely, data path $62_i$ or SCSI controller 100. The operations are substantially symmetric. The read and write strobe signals may be asserted by any of a plurality of circuit components, as will be described further below, therefore a multiplexer ("MUX") 104 is provided for each strobe signal. Each MUX 104 is independently responsive to a signal from the processor bus 101 to select an input to pass through to FIFO buffer 102.

The components which can assert the write strobe signal include four sequencers. These four sequencers comprise a DSI sequencer 106, a data path sequencer $120_i$ having an associated counter $121_i$, and a sequencer for each of ACC 46a and ACC 46b, each with an associated counter. For simplification, only a single ACC sequencer and counter, ACC sequencer 132a and counter 133a for ACC 46a is shown. The reader will appreciate that connections to the sequencer and counter for ACC 46b are similar to those illustrated for ACC sequencer 132a and counter 133a.

DSI sequencer 106 is responsive to a DMA request ("DREQ") signal from SCSI controller 100 to coordinate disk accesses with FIFO buffer 102 in a conventional manner. DSI sequencer 106 is also responsive to a pause signal to suspend operation after complete processing of a current block. DSI sequencer 106 includes a counter to determine when an entire block of data has been written to FIFO buffer 102 from SCSI controller 100 or that an entire block of data has been written from FIFO buffer 102 to SCSI controller 100. It is important to note that data is operated on in block size. DSI $60_i$ has room for two blocks, one block may be coming in, another block may be leaving.

DSI sequencer 106 monitors the status of FIFO buffer 102 by use of its counter and asserts a ready ("RDY") signal when FIFO buffer 102 is "ready" to move data with respect to data bus $62_i$. That is, for operations when data is received from routing and correcting circuit 42 and to be written to disk drive $22_{ij}$, FIFO buffer 102 is ready when FIFO buffer 102 can store an entire block of data. Similarly, FIFO buffer 102 is ready to transfer data to routing and correcting circuit 42 during read operations when an entire block has been read by SCSI controller 100 and stored in FIFO buffer 102. By establishing FIFO buffer 102 with a storage capacity of at least twice a block size, and use of the counter to establish that an entire block has been transferred out, or transferred in, DSI sequencer 106 identifies that FIFO buffer 102 is ready during write operations and read operations, respectively. DSI sequencer 102 is operative with a DSI flip/flop $134_i$ to control the ready signal. DSI flip/flop $134_i$ has an output, the ready signal, coupled to both ACC sequencer 132a and to datapath sequencer $120_i$ as will be further described below.

DSI $60_i$ also includes a multiplexer 140 through which data from a data block check function circuit 144 may be added or sampled during disk accesses.

Routing and correcting circuit 42 not only includes a particular crossbar switch 44 (see FIG. 2) to which data path $62_i$ is coupled to, but also includes a DSI mask register ("DMR") 150a and Buffer Mask register ("BMR") 150b. DMR 150a is coupled to a plurality of RDY signals, as provided as an output of a plurality of DSI flip/flops $134_i$, of DSI sequencer 106 of each DSI $60_i$. BMR 150b is coupled to a plurality of ready signals from a plurality of buffer flip/flops $146_i$. DMR 150a and BMR 150b are responsive to control information from a DSI control register ("DCR") 152a and a buffer control register ("BCR") 152b, respectively, to select a group of a plurality of data for processing by routing and correcting circuit 42. In the present embodiment, when two ACC 46 circuits are included, each ACC 46 has a DMR/DCR and BMR/BCR configuration. In the case of a first DMR 150a coupled to ACC1 46a, when a particular set of DSI $60_i$ units are each ready to send or receive ("transfer") an entire block of data as appropriate for the desired operation, then first DMR 150a asserts a master ready signal to ACC1 46a. This assertion of the master ready signal occurs when each DSI sequencer 106 of the particular set of DSI $60_i$ units, concurrently asserts its respective ready signal. Buffer flip/flops $146_i$ are operative to control data flow between WA $32_i$ (See. FIG. 2) and routing and correcting circuit 42. A particular ACC sequencer 132a will send a data request signal to a set of buffers $30_i$ which are involved in a particular operation. As each buffer $30_i$ responds by sending a data word to the word assembler/disassembler, the buffer $30_i$ asserts its ready signal, or transfer complete signal, by setting buffer flip/flop $146_i$. When all these buffer flip/flops $146_i$ are set, then BMR 150b will assert a second master ready signal to ACC sequencer 132a.

As the reader will readily appreciate, the word assembler/disassembler is present because the routing and correcting circuit 42 must interface with a memory storing a plurality of bytes as words, the word assembler takes a word and outputs it a byte at a time during write operations to particular disk drives. However, during read operations, this same procedure may be implemented. That is, once buffer $30_i$ is ready to accept a word from the word assembler $32_i$, buffer $30_i$ may set the buffer flip/flop $146_i$. Routing and correcting circuit 42 will provide a number of bytes equal to one word, one byte at a time, to each word assembler. When the word is complete, ACC sequencer 132a will reset buffer flip/flop $146_i$ indicating that a word has been entered in the word assembler. The word will be transferred to the buffer $30_i$. Then, the buffer $30_i$ will set the buffer flip/flop $146_i$ when it is ready again. This transfer of data, from the word assembler to the buffer $30_i$ occurs so much faster, as bytes are converted into words, that the ready signal from the buffers $30_i$ is not required by the ACC during read operations. The ACC will use only the ready signals from the DSI $60_i$ for read operations.

Similarly, when a particular group of buffers $30_i$ (See FIG. 2) are each ready to transfer a word, then a first BMR 150b, which is coupled to ACC sequencer 132a, will assert its master ready signal in response to a plurality of ready signals concurrently asserted from each of the particular set of buffers $30_i$.

A second pair of mask registers are identical in configuration, function and connection as illustrated for the first pair of mask registers DMR 150a and BMR 150, except that the second pair are coupled to the ACC sequencer of ACC 46b rather than to ACC sequencer 132a illustrated in FIG. 3. The second pair of mask registers assert respective master ready signals in response to a concurrent assertion of individual ready signals of a second group of the plurality of DSI $60_i$ units coupled to a second pair of mask registers. In the preferred embodiment, the same DSI $60_i$ ready signals are coupled to both DMRs 150a.

Operation

Figure 4:
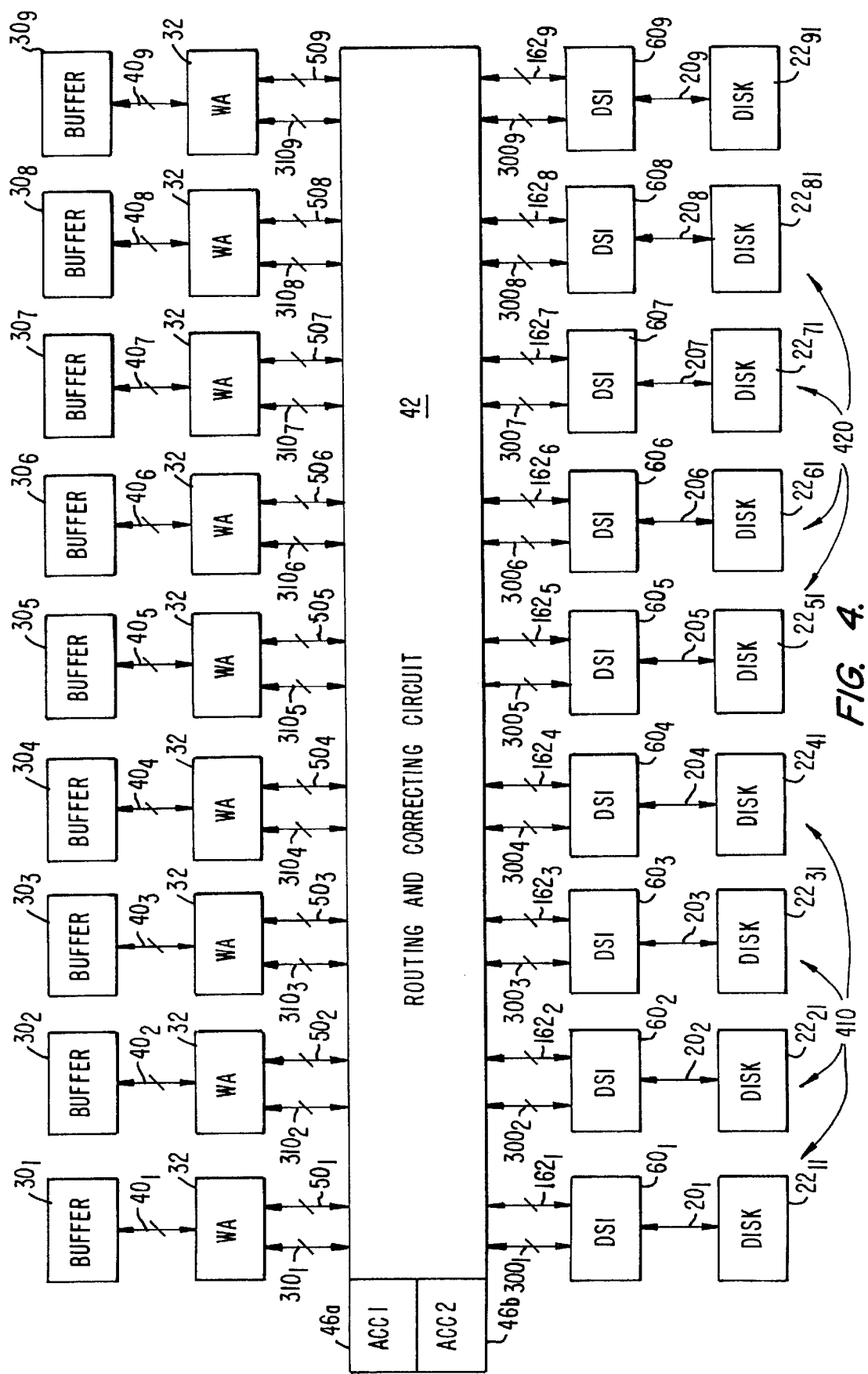
FIG. 4 is a block diagram of a portion of a particular PAC 16a which includes the preferred embodiment of DSI $60_i$ and routing and correcting circuit ("RACC") 42 illustrated in FIG. 3.

Next, operation of the synchronizing system will be described. FIG. 4 is a block diagram of a portion of a particular PAC 16a which includes the preferred embodiment of DSI $60_i$ and routing and correcting circuit 42 illustrated in FIG. 3. A first plurality of control buses $300_i$ couples control signals from RACC 42 of FIG. 2 to DSI $60_i$. A second plurality of control buses $310_i$ couples control signals from RACC 42 of FIG. 2 to WA $32_i$.

It is necessary to ensure that proper P and Q redundancy data blocks are generated and recorded for a set of associated data of a set of a plurality of blocks of data from the particular group of buffers $30_i$. All the data written to a group of disk drives $22_{ij}$ are controlled by the particular group of DSI $60_i$ units.

Three processes will be outlined below. First, a description of a synchronized generation of P and Q redundancy data blocks during a write operation to a first redundancy group 410 will be provided. Second, a regeneration of a portion of a second redundancy group 420 will be described. Third, a simple write operation will be set forth. A redundancy group is stored on a particular set of disk drives $22_{ij}$ and consists of a particular set of associated data and P and Q redundancy data blocks generated for the particular set of associated data. The redundancy group defines a set of associated data and its redundancy data. More than one redundancy group may be present on disk drives $22_{11}$–$22_{91}$ at any given instant.

A first set of a plurality of blocks of data from two buffers $30_1$ and $30_2$ is to be recorded to disk drives $22_{11}$ and $22_{21}$, respectively. For this operation, routing; and correcting circuit 42 is configured for P and Q redundancy data block generation mode.

ACC1 46a will send a request signal, via multiplexers to desired buffers $30_i$, first buffer $30_1$ and second buffer $30_2$ in the present example. As each buffer $30_i$ sends its respective data, word by word, to WA $32_i$, each buffer $30_i$ sets its respective buffer flip/flop $146_i$. A first BMR 150b has been configured to monitor buffer flip/flop $146_1$ and buffer flip/flop $146_2$ so that when both are concurrently set, asserting its respective "RDY" signal, first BMR 150b asserts a first master ready signal to ACC1 46a indicating that transfer from buffer to word assembler is complete and that a word is available in each word assembler necessary for the P and Q redundancy data generation.

Each of the blocks of data has a predetermined number of bytes of data N. Thus, for the first block of the first set of data in the two buffers $30_i$, there are N byte pairs which will have both a P redundant data block and a Q redundant data block generated for them by routing and correcting circuit 42. Routing and correcting circuit 42 thus produces two new blocks of data, a P redundant data block and a Q redundant data block, each comprised of the respective P and Q redundancy bytes for each data byte pair. All four blocks are to be recorded to respective disk drives $22_{11}$, $22_{21}$, $22_{31}$ and $22_{41}$ by use of four DSI units $60_1$, $60_2$, $60_3$ and $60_4$. Thus, the data on disk drives $22_{11}$, $22_{21}$, $22_{31}$ and $22_{41}$ define the first redundancy group 410.

These four DSI units $60_i$ must be concurrently ready to each receive a block of data before processing will commence. Thus, DSI sequencer 106 of each DSI unit $60_1$, $60_2$, $60_3$ and $60_4$ must assert its respective ready signal to a first DMR 150a, coupled to ACC1 46a by setting their respective DSI flip/flops $134_i$. A first DMR 150a has been configured by its associated DCR 152a to assert a second master ready signal to ACC1 46a when all four ready signals are concurrently asserted from each DSI unit $60_1$, $60_2$, $60_3$ and $60_4$. That is, once DSI flip/flops $134_1$ through DSI flip/flop $134_4$ are set.

When ACC1 46a begins accessing the word assembler, it takes the word and resets buffer flip/flop $146_1$ and buffer flip/flop $146_2$ which resets the first master ready signal. The ACC1 46a processes the word byte by byte and generates the predetermined number of P redundancy bytes and Q redundancy bytes of the redundancy data for the particular block of data. ACC1 46a strobes the bytes, including the P and Q redundancy data bytes, into respective FIFO buffers 102 of DSI $60_1$ through $60_4$. ACC1 46a asserts the FIFO write strobe to the FIFO buffers 102 as each byte is processed until the word, and its newly created associated redundancy data bytes, has been loaded.

This procedure of creating and recording the first redundancy group 410 continues, with the ACC generating P and Q redundancy bytes on each word, byte by byte, and storing the bytes into the FIFO buffers 102 until an entire block has been processed. When a block has been written to the FIFO buffers 102 of $DSI_1$–$DSI_4$, ACC1 $46_4$ resets both the DSI flip/flops $134_i$ and buffer flip/flops $146_i$, clearing all the master ready signals.

The resetting of DSI flip/flop $134_i$ is an indication to the DSI sequencer 106 that the DSI has received an entire data block, which may now be stored to its disk. Each $DSI_1$–$DSI_4$ independently begins to write their data block to the disk drive $22_{11}$–$22_{41}$, respectively. For the second block, DSI sequencers 106 will immediately set their DSI flip/flops $134_i$ as FIFO buffer 102 is designed to store at least 2 blocks, and therefore has room for one more block. The concurrent assertion of the 4 ready signals from DSI $60_1$–DSI $60_4$ will assert again the second master ready to the ACC1. The processing of the second blocks proceeds as described above, with the first master ready being asserted and negated as each word is processed. When the second block has been strobed into the FIFO buffers 102, then all the flip/flops are cleared again, clearing the master ready signals.

The second master ready signal cannot be asserted again until DSI sequencer 106 has counted that a complete block, the first block for example, has been stored to its respective disk drive $22_{ij}$. DSI sequencer 106 indicates that its associated FIFO buffer 102 has room for another block, by setting its associated flip/flop $134_i$, thereby asserting its ready signal. The processing of blocks continues in this fashion until all the desired blocks of data have been transferred from buffer $30_1$ and buffer $30_2$, to disk drives $22_{11}$–$22_{41}$.

Processor 72 preconfigures MUXs 104 of each DSi unit $60_1$, $60_2$, $60_3$ and $60_4$ to cause a strobe signal from ACC1 46a to be used as the write strobe signal for FIFO buffer 102 of each of these four DSI units $60_1$–$60_4$. A strobe signal from DSI sequencer 106 of each of these four DSI units $60_1$–$60_4$ is used as the read strobe signal to FIFO buffer 102. The other DSI units $60_5$–$60_9$ will ignore strobe pulses from ACC1 46a.

Each DSI sequencer 106 operates in a conventional manner with SCSI controller 100 to write data to the respective disk drive $22_{ij}$, one byte at a time, independent of the other disk drives. As the reader will appreciate, the various disk drives $22_{ij}$ will record their information at different rates and the FIFO buffers 102 will empty at different rates even though they are being filled at the same rate.

As each block of data is being recorded to a disk drive, the bytes are sampled by data block check function circuit 144 which checks the data against the previously generated check data values to assure proper operation.

Generally, more than 1 block is to be recorded, and the transferring of additional blocks of data from the buffers $30_i$ through routing and correcting circuit 42 to DSIs $60_i$ proceeds as outlined above. As each FIFO buffer 102 is preferably two sector length in size, the transferring of the first two blocks of a first plurality of blocks will generally proceed in a straight forward manner as described above. When the third block of data is to be transferred, then there may be some delay introduced as each of the four DSIs $60_1$, $60_2$, $60_3$ and $60_4$ empty at different rates from their FIFO buffer 102 to their respective disk drive $22_{ij}$ under control of their respective DSI sequencer 106.

For the third and following blocks of data the synchronizing process continues as follows. Each respective DSI sequencer has been counting each byte of data as it has been directed to SCSI controller 100 in a conventional manner. When it has counted that the first block has been written, it is able to assert its respective ready signal indicating that it now has room for the third block of data to be stored behind the second block currently stored. When all the ready signals of DSI sequencers $106_1$–$106_4$ are concurrently asserted, then ACC1 46a is able to proceed with the third block, provided buffers $30_1$ and $30_2$ are ready as well. The third block is processed as described above and added to FIFO buffer 102 of DSI units $60_1$–$60_4$. As the second block is completely recorded to the respective disk drive $22_{ij}$ of each respective DSI $60_i$, then each respective DSI sequencer 106 will assert its ready signal indicating that it is ready to receive the fourth block. The described procedure continues until the first set of the plurality of blocks of data is recorded to disk drives $22_{11}$–$22_{41}$.

While the process of recording the first redundancy group 410 is proceeding, regeneration of missing data from a second redundancy group 420 previously recorded in the above described manner on disk drives $22_{51}$, $22_{61}$, $22_{71}$ and $22_{81}$ may be independently and simultaneously implemented. Regeneration of missing data blocks is typically required when a disk drive, $22_{51}$ for example, fails. In this case, by reading data from disk drive $22_{61}$ and associated P and Q redundancy data recorded on disk drives $22_{71}$ and $22_{81}$, for example, and using routing and correcting circuit 42, missing data from failed disk drive $22_{51}$ may be regenerated into an unused buffer $30_i$. For this example, buffer $30_9$ may have been designated a spare buffer $30_i$ associated with a spare disk drive $22_{91}$.

Data to be read from the functioning disk drives $22_{61}$, $22_{71}$ and $22_{81}$ (the second redundancy group 420) is accessed via the respective DSIs $60_6$, $60_7$ and $60_8$. The regeneration of data must be performed in a synchronized fashion to ensure that the proper P and Q redundancy data blocks for the proper data are matched and processed together to guarantee that the missing data is properly regenerated. Each of these DSIs $60_6$–$60_8$ is instructed to begin reading the available data of the second redundancy group 420, byte by byte, which will be combined and used to regenerate the missing data in a well known fashion and which will not be further addressed herein.

DSI sequencer 106 of DSI units $60_6$–$60_8$ requests its associated SCSI controller 100 to provide data for the first block of the second set of data, byte by byte, to the associated FIFO buffer 102. DSI sequencer 106 counts bytes received from the disk drive as the data is strobed into its FIFO buffer 102 by assertions of a write signal to FIFO buffer 102. When DSI sequencer has counted that all the bytes of the first block of data have been loaded into FIFO buffer 102, it will assert its ready line by setting DSI flip/flop $134_i$.

A second DMR coupled to ACC2 46b, receives all the ready signals of DSI units $60_1$–$60_9$. Second DMR is configured by its associated DCR to respond to a second group of DSI units $60_i$, which in this case includes DSI units $60_6$–$60_8$. The reader will note that the second DMR will not wait for a ready signal from DSI unit $60_5$, which normally would be part of the second group of DSIs $60_i$ for read operations of this particular data.

The ready signals from this second group of DSIs $60_6$, $60_7$ and $60_8$ will be monitored by the second DMR until they all are concurrently asserted. When this condition occurs, then a first master ready signal is asserted to ACC2 46b by second DMR.

ACC2 46b may also wait for an assertion of a second master ready signal by a second BMR. As noted above for writes to buffer $30_i$ it is not necessary to wait for ready signals of the particular buffers. When the desired buffers $30_i$, the single buffer $30_9$ in this example, are all concurrently ready, then the second BMR will assert its master ready signal, the second master ready signal, for ACC2 46b if implemented. For other read operations, as for example if drive $22_{51}$ were functioning and it were desired to read blocks of data from the second group from disk drives $22_{51}$ and $22_{61}$, then two buffers $30_5$ and $30_6$ for example, would both need to be concurrently ready.

When ACC2 46b receives both master ready signals, then it will assert a strobe signal coupled to all DSI units $60_1$–$60_9$. However, signals from the processor bus 101 has preconfigured a first MUX 104 of DSI units $60_6$–$60_8$, to pass a strobe signal from ACC2 46b as the read strobe signal to each of their respective FIFO buffers 102. The second MUX 104 of these DSI units $60_6$–$60_8$ is configured to select a strobe signal from the associated DSI Sequencer 106 as the write strobe signal. Due to this configuration of the respective MUX 104, only FIFO buffers $102_6$–$102_8$ will respond to the assertion of the strobe signal of ACC2 46b to output. data to routing and correcting circuit 42.

Routing and correcting circuit 42 operates on a data byte and its associated P and Q redundancy data byte to regenerate each missing byte and direct it to buffer $30_9$. Routing and correcting circuit 42, via ACC2 46b, proceeds at its own pace, correcting data byte by byte until an associated counter determines that an entire block has be read from the respective FIFO buffers 102 of the second group of DSI units $60_6$–$60_8$ and corrected.

While the first block of data is being regenerated, the DSI sequencers $106_6$–$106_8$ are loading the second block of data into their associated FIFO buffers 102 to be processed by routing and correcting circuit 42 as described above. When each DSI sequencer $106_6$–$106_8$ counts that the second block is stored, then they will assert their individual ready signals. The second DMR will assert its master ready to ACC2 46b when the appropriate ready signals are concurrently asserted. Thereafter, the second and subsequent blocks of data may be processed as described above.

ACC1 46a is generating P and Q redundancy data blocks for the first redundancy group 410, and DSIs $60_6$, $60_7$ and $60_8$ have their respective FIFO buffers $102_i$ responding to read strobe signals asserted from ACC2 46b to regenerate, a second redundancy group 420 simultaneously as the first redundancy group 410 is being recorded.

The ACC sequencer of ACC2 46b will continue to assert the read strobe signals to the DSIs $60_6$, $60_7$ and $60_8$ as it becomes ready, and an associated counter will indicate when an entire block has been regenerated. After ACC2 46b has begun operation upon a data block, the status of the master ready is ignored until a complete block has been processed upon which time, ACC2 46b resets the respective DSI flip/flop $134_i$. Thereafter, ACC2 46b will wait until the master ready signal is asserted again by the second DMR before processing a subsequent block.

DSI units $60_1$–$60_8$ are simultaneously committed to the first two modes of operation as outlined above on their respective redundancy groups. After the entire second redundancy group 420 has been regenerated, with missing data from failed disk drive $22_{51}$ stored into buffer $30_9$, a third mode of operation may be implemented as now described. The third mode, in this example, performs a simple write operation of the regenerated data to disk drive $22_{91}$ from buffer $30_9$.

Simple write mode uses data path sequencer $120_9$ and an associated counter $121_9$ to write data to $DSI_9$. When both FIFO buffer $120_9$ and buffer $30_9$ are ready, as described above, then they assert their ready signals (i.e., set their flip/flops). These ready signals are provided directly to data path sequencer $120_9$ which is able to immediately assert a strobe signal coupled to DSI $60_9$ because it does not have to wait for a master ready signal to be asserted by a mask register. DSI $60_9$ responds to the assertion of the write strobe signal by data path sequencer $120_9$ as a first MUX 104 of DSI unit $60_9$ has been preconfigured to select the data path sequencer $120_9$ as the write strobe signal for FIFO buffer $102_9$.

When data path sequencer $120_9$ is ready, and DSI $60_9$ has asserted its ready signal indicating FIFO buffer $102_9$ is ready to accept a block of data, data transfer commences. DSI sequencer $106_9$, because of a second MUX 104 of DSI unit $60_9$, will assert a strobe signal selected as the read strobe signal to FIFO buffer $102_9$ to record the regenerated data from buffer $30_9$ to disk drive $22_{91}$ by use of SCSI controller $100_9$. As described above, DSI sequencer $106_9$ monitors the status of FIFO buffer $102_9$ and asserts its respective ready signal when another block may be received by the FIFO buffer 102.

This process continues until the regenerated data of the missing blocks of data of the second set of data are recorded. The reader will further appreciate that this operation does not need to use the routing and correcting circuit 42 because the P and Q redundancy data blocks have been pre-generated and stored and that this operation can proceed generally independently and concurrent to operation of ACCs 46a and 46b. A simple read operation is similar to the simple write operation and requires handshaking between a particular data path sequencer $120_i$ and a DSI sequencer 106 interacting with the buffer and DSI flip/flops.

Figure 5:
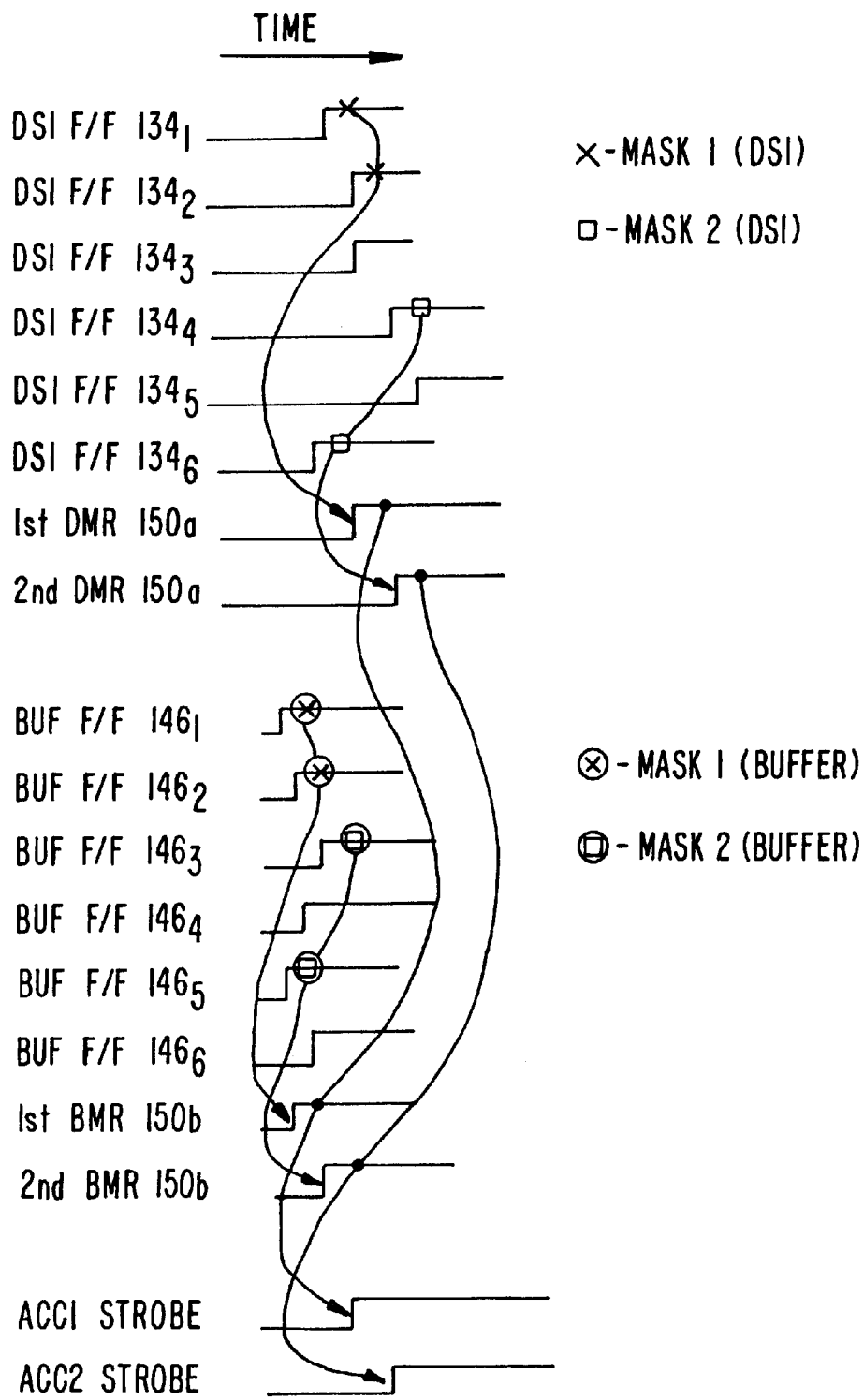
FIG. 5 is a set of timing signals used in a transfer of data according to the present invention.

FIG. 5 is a set of timing diagrams illustrating operation and relationships of signals of a preferred embodiment of the present invention. FIG. 5 illustrates operation of a system having DSIs $60_1$–$60_6$, ACC1 46a and ACC2 46b with respective mask register pairs of DMR 150a and BMR 150b, and buffers $30_1$–$30_6$. A first mask and a second mask for DSI $60_i$ are used to select DSI $60_1$ and DSI $60_2$ as particular inputs for ACC1 46a. When both signals are concurrently asserted, the first DMR asserts a master ready signal. On the buffer side, a first mask and a second mask are provided, as identified, for monitoring the status of buffer flip/flops $146_i$. The first and second masks on the buffer 30 side do not need to correspond to the same lines as the masks on the DSI $60_i$ side. When buffer flip/flop $146_1$ and buffer flip/flop $146_2$ are concurrently asserted, then first BMR 150b asserts its master ready signal. The assertion of both master ready signals, from DMR 150a and BMR 150b, initiates an ACC1 strobe.

Similarly, for operation of the second ACC2 circuit, concurrent assertions from signals identified by the second masks on the DSI $60_i$ and buffer 30 side initiate an assertion of ACC2 strobe. A concurrent assertion of DSI flip/flop $134_4$ and DSI flip/flop $134_6$ assert a master ready from a second DMR. A concurrent assertion of buffer flip/flop $146_3$ and buffer flip/flop $146_5$ assert in turn a master ready signal from a second BMR. The assertion of master ready signals from second DMR and second BMR initiates an ACC2 strobe as illustrated.

The reader will note that in the above description, that data was described as occurring in pairs. This description was for explanation only. P and Q redundancy data blocks may be generated for data triplets, quadruplets, etc. It also must be appreciated that drives are dynamically configurable for various functions and that a disk drive may be a "Q" drive for particular data and store actual data at other times. The assignment of groups of drives need not be done in physical arrangement as described, nor must a drive remain in a particular group for all data. A particular drive may store data from a plurality of groups. The housekeeping tasks associated with this dynamic versatility is accomplished by controller software as the reader will readily appreciate.

The invention has been described by reference to specific embodiments. Other embodiments will be apparent, to those of ordinary skill in the art without departing from the spirit of the present invention. It is therefore not intended that the invention be limited except as indicated by the appended claims.

What is claimed is:

1. An apparatus for aligning a plurality of associated portions of a code word received from a plurality of asynchronous data sources for presentation of the code word in parallel to a processing circuit, the apparatus comprising:

a plurality of buffers, coupled to an input of the processing circuit, for collectively holding the code word, one buffer provided for each one associated portion of the code word, each associated portion including a plurality of bits, wherein each associated portion of the code word is asynchronously received by its associated buffer from one of the data sources, said data sources being accessed asynchronously with respect to each other; and control means, coupled to said plurality of buffers and to the processing circuit, for signaling to the processing circuit that all of the associated portions of the code word are held in said plurality of buffers, wherein said control means responds to an assertion of a first signal from the processing circuit to assert a second signal to each of said plurality of buffers to provide all of the associated portions of the code word to said processing circuit in parallel.

2. The apparatus of claim 1 further comprising:

a second plurality of buffers coupled to an output of said processing circuit for receipt of a processed code word from said processing circuit; and means for asserting a ready signal to said processing circuit when said second plurality of buffers are ready; wherein said processing circuit suspends processing until said ready signal is asserted and said processing circuit is signaled that said first plurality of buffers are ready.

3. An apparatus for aligning a plurality of associated portions of a plurality of code words, each associated portion of a code word received from a plurality of asynchronous data sources for presentation of each of the code words to a processing circuit, comprising:

a plurality of buffers, coupled to an input of the processing circuit, for collectively holding a particular one code word of the plurality of code words, one buffer provided for each one of the associated portions of said particular one code word, each associated portion including a plurality of bits;

a plurality of interface circuits, coupled respectively to said plurality of buffers, each interface circuit presenting a particular associated portion of said particular code word from a particular one of the asynchronous data sources to said respective buffer, wherein the data sources are accessed asynchronously with respect to each other, such that said plurality of interface circuits present their particular associated portions of said code word to said plurality of buffers with a time skew between a first presented particular associated portion and a last presented particular associated portion, said data sources being accessed asynchronously with respect to each other;

aligning means, coupled to said plurality of buffers, for:
signaling to the processing circuit that all associated portions of said particular code word are held in said plurality of buffers; and
responding to an assertion of a first signal from said processing circuit to provide all said associated portions of said code word to said processing circuit within a processing cycle of said processing circuit.

4. The apparatus of claim 3, wherein the aligning means is further configured to obtain another particular code word from the plurality of code words if other code words of the plurality of code words have not been processed.

5. The apparatus of claim 4 wherein said aligning means signals said processing circuit when all of the plurality of associated portions of all of said plurality of code words are held in said plurality of buffers to enable processing by the processing circuit and wherein said processing circuit continues to process said plurality of code words in real time until a last code word of said plurality of code words is processed.

6. The apparatus of claim 3, further comprising:
a second plurality of buffers coupled to an output of said processing circuit for receipt of a processed code word from said processing circuit; and
means for asserting a ready signal to said processing circuit when said second plurality of buffers are ready; wherein
said processing circuit suspends processing until said ready signal is asserted and said processing circuit is signaled that said first plurality of buffers are ready.

7. A method of aligning associated portions of a code word, comprising the steps of:
accessing asynchronously a first one and a second one of the associated portions of the code word, one portion from a particular one of a plurality of storage devices, with each portion from a different storage device and each portion including a plurality of bits, wherein a time skew exists between accessing said first one associated portion and said second one associated portion;
buffering, in a plurality of corresponding buffers, said first one and said second one of said associated portions to remove said time skew, and thereafter
signaling a processing circuit that said first one and said second one of the plurality of associated portions of the code word are ready.

8. The method of claim 7, further comprising the step of presenting, in response to a signal from the processing circuit, said first one and said second one of said associated portions of the code word in parallel to said processing circuit.

9. The aligning method of claim 7 wherein a block of said plurality of associated portions of code words are accessed, buffered and presented in parallel to said processing circuit.

10. An apparatus for aligning a plurality of associated portions of a code word received from a plurality of asynchronous data sources for presentation of the code word in parallel to a processing circuit, the apparatus comprising:

a plurality of buffers, coupled to an input of the processing circuit, for collectively holding the code word, one buffer provided for each one associated portion of the code word, each associated portion including a plurality of bits, wherein each associated portion of the code word is asynchronously received by its associated buffer from one of the data sources, said data sources being accessed asynchronously with respect to each other; and a control circuit, coupled to said plurality of buffers and to the processing circuit, wherein the control circuit signals to the processing circuit that all of the associated portions of the code word are held in said plurality of buffers, wherein said control circuit responds to an assertion of a first signal from the processing circuit to assert a second signal to each of said plurality of buffers to provide all of the associated portions of the code word to said processing circuit in parallel.

11. The apparatus of claim 10, further comprising:
a second plurality of buffers coupled to an output of said processing circuit for receipt of a processed code word from said processing circuit; and
means for asserting a ready signal to said processing circuit when said second plurality of buffers are ready; wherein
said processing circuit suspends processing until said ready signal is asserted and said processing circuit is signaled that said first plurality of buffers are ready.

12. An apparatus for aligning a plurality of associated portions of a plurality of code words, each associated portion of a code word received from a plurality of asynchronous data sources for presentation of each of the code words to a processing circuit, comprising:

a plurality of buffers, coupled to an input of the processing circuit, for collectively holding a particular one code word of the plurality of code words, one buffer provided for each one of the associated portions of said particular one code word, each associated portion including a plurality of bits;

a plurality of interface circuits, coupled respectively to said plurality of buffers, each interface circuit presenting a particular associated portion of said particular code word from a particular one of the asynchronous data sources to said respective buffer, wherein the data sources are accessed asynchronously with respect to each other, such that said plurality of interface circuits present their particular associated portions of said code word to said plurality of buffers with a time skew between a first presented particular associated portion and a last presented particular associated portion, said data sources being accessed asynchronously with respect to each other;

an alignment circuit, coupled to said plurality of buffers, configured to:

signal to the processing circuit that all associated portions of said particular code word are held in said plurality of buffers; and respond to an assertion of a first signal from said processing circuit to provide all said associated portions of said code word to said processing circuit within a processing cycle of said processing circuit.

13. The apparatus of claim 12, wherein the alignment circuit is further configured to obtain another particular code word from the plurality of code words if other code words of the plurality of code words have not been processed.

14. The apparatus of claim 13, wherein said alignment circuit signals said processing circuit when all of the plurality of associated portions of all of said plurality of code words are held in said plurality of buffers to enable processing by the processing circuit and wherein said processing circuit continues to process said plurality of code words in real time until a last code word of said plurality of code words is processed.

15. The apparatus of claim 12, further comprising:

a second plurality of buffers coupled to an output of said processing circuit for receipt of a processed code word from said processing circuit; and means for asserting a ready signal to said processing circuit when said second plurality of buffers are ready; wherein said processing circuit suspends processing until said ready signal is asserted and said processing circuit is signaled that said first plurality of buffers are ready.

* * * * *